United States Patent
Shim et al.

(10) Patent No.: US 10,197,873 B2
(45) Date of Patent: Feb. 5, 2019

(54) DISPLAY DEVICE

(71) Applicant: Samsung Display Co., Ltd., Yongin-si (KR)

(72) Inventors: Chan Wook Shim, Asan-si (KR); Ju Hyun Woo, Asan-si (KR); Kook Hyun Choi, Seoul (KR); Jun Seok Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/701,848

(22) Filed: Sep. 12, 2017

(65) Prior Publication Data

US 2018/0157132 A1 Jun. 7, 2018

(30) Foreign Application Priority Data

Dec. 6, 2016 (KR) ........................ 10-2016-0165138

(51) Int. Cl.
| | | |
|---|---|---|
| *G02F 1/1339* | (2006.01) | |
| *G02F 1/1362* | (2006.01) | |
| *G02F 1/1343* | (2006.01) | |
| *G02F 1/1335* | (2006.01) | |

(52) U.S. Cl.
CPC ...... *G02F 1/136204* (2013.01); *G02F 1/1339* (2013.01); *G02F 1/13394* (2013.01); *G02F 1/133512* (2013.01); *G02F 1/134309* (2013.01); *G02F 1/136286* (2013.01); *G02F 2001/136222* (2013.01); *G02F 2201/121* (2013.01)

(58) Field of Classification Search
CPC .................................................. G02F 1/1339
See application file for complete search history.

(56) References Cited

U.S. PATENT DOCUMENTS

| | | | |
|---|---|---|---|
| 2004/0183992 A1* | 9/2004 | Lee ........................ | G02F 1/1339 349/187 |
| 2006/0023135 A1* | 2/2006 | Park .................. | G02F 1/136204 349/40 |
| 2008/0106661 A1 | 5/2008 | Kim et al. | |
| 2010/0123846 A1 | 5/2010 | Kim et al. | |
| 2011/0090445 A1* | 4/2011 | Kim ...................... | G02F 1/1339 349/139 |
| 2011/0116019 A1 | 5/2011 | Hwang et al. | |

(Continued)

FOREIGN PATENT DOCUMENTS

| | | |
|---|---|---|
| KR | 10-2010-0055709 | 5/2010 |
| KR | 10-2010-0098922 | 9/2010 |

(Continued)

*Primary Examiner* — James Dudek
(74) *Attorney, Agent, or Firm* — H.C. Park & Associates, PLC

(57) ABSTRACT

A display device including a first substrate having a display area and a peripheral area surrounding the display area, a second substrate facing the first substrate, a common voltage line disposed on the peripheral area of the first substrate, a color filter disposed on the common voltage line overlapping the common voltage line, a common electrode disposed below the second substrate and having an opening overlapping the common voltage line and the color filter, and a sealant disposed between the color filter and the common electrode overlapping the common voltage line, the color filter, and the opening.

20 Claims, 7 Drawing Sheets

(56) References Cited

U.S. PATENT DOCUMENTS

| | | | |
|---|---|---|---|
| 2012/0086900 A1 | 4/2012 | Yu et al. | |
| 2015/0029428 A1* | 1/2015 | Wang | G02B 5/201 |
| | | | 349/42 |
| 2015/0185516 A1* | 7/2015 | Lee | G02F 1/1339 |
| | | | 349/110 |
| 2015/0301370 A1* | 10/2015 | Moriwaki | G02F 1/1339 |
| | | | 349/42 |

FOREIGN PATENT DOCUMENTS

| | | |
|---|---|---|
| KR | 10-1108782 | 2/2012 |
| KR | 10-2012-0037173 | 4/2012 |
| KR | 10-1306860 | 9/2013 |
| KR | 10-2014-0032762 | 3/2014 |
| KR | 10-1582945 | 1/2016 |

* cited by examiner

DISPLAY DEVICE

CROSS-REFERENCE TO RELATED APPLICATION

This application claims priority from and the benefit of Korean Patent Application No. 10-2016-0165138 filed on Dec. 6, 2016, which is hereby incorporated by reference for all purposes as if fully set forth herein.

BACKGROUND

Field

The invention relates generally to a display device, and, more particularly, to a display device capable of preventing internal damage caused by static electricity.

Discussion of the Background

Recently, various display devices such as a liquid crystal display, an organic light emitting diode display, and so on, have been commercially available.

Such display devices include a display area in which a plurality of pixels and a switching element are disposed on an insulation substrate to display images thereon, and a peripheral area in which a pad unit for supplying signals to the display area and a driver therefor are disposed.

When static electricity is generated in the display device, it may flow into the display device through wires formed in the display device. If the static electricity flows into the display device, it may damage an insulating layer, a switching element, and the like. This causes defects in the display device.

The above information disclosed in this Background section is only for enhancement of understanding of the background of the inventive concepts, and, therefore, it may contain information that does not form the prior art that is already known in this country to a person of ordinary skill in the art.

SUMMARY

Display devices constructed according to the principles of the invention are capable of preventing static electricity from flowing into the display device. For example, the display device may be capable of preventing static electricity from being transferred into a display area of the device, by including gaps or discontinuities in conductive lines in the display device.

According to other optional features of the invention color filters may be provided in areas overlapping the gaps to minimize or prevent light leakage through the gaps. Another optional feature is providing a capacitor formed between a dummy pattern and a conductor such as an electrode to reduce or prevent damage to various components of the display device caused by static electricity.

Additional aspects will be set forth in the detailed description which follows, and, in part, will be apparent from the disclosure, or may be learned by practice of the inventive concepts.

According to one aspect of the invention, a display device includes a first substrate having a display area and a peripheral area surrounding the display area, a second substrate facing the first substrate, a common voltage line disposed on the peripheral area of the first substrate, a color filter disposed on the common voltage line overlapping the common voltage line, a common electrode disposed below the second substrate and having an opening overlapping the common voltage line and the color filter, and a sealant disposed between the color filter and the common electrode overlapping the common voltage line, the color filter, and the opening.

The display device may further include a light blocking member disposed between the second substrate and the common electrode.

The display device may further include a groove formed in a bottom surface of the light blocking member, and the groove may overlap the opening in the common electrode.

A width of the color filter may be wider than at least one of a width of the groove and a width of the opening.

A width of the sealant may be wider than that of the opening.

The color filter may be a blue filter.

The display device may further include a dummy electrode pattern disposed on the first substrate.

The dummy electrode pattern may be disposed between the color filter and the sealant.

The dummy electrode pattern may be electrically isolated.

The dummy electrode pattern may be connected with the common voltage line.

The display device may further include an insulating layer disposed between the dummy electrode pattern and the common voltage line, and a contact hole formed in the insulating layer overlapping the common voltage line, and the dummy electrode pattern may be connected with the common voltage line through the contact hole.

The contact hole might not overlap the color filter.

The dummy electrode pattern and the common voltage line may be configured to transmit a common voltage during operation of the display device.

The display device may further include a dummy common voltage line disposed between the dummy electrode pattern and the common voltage line, and the dummy electrode pattern may be connected with the dummy common voltage line.

The display device may further include an insulating layer disposed between the dummy electrode pattern and the dummy common voltage line, and a contact hole formed in the insulating layer to overlap the dummy common voltage line; and, the dummy common voltage line may be connected with the dummy common voltage line through the contact hole.

The contact hole might not overlap the color filter.

The dummy electrode pattern and the dummy common voltage line may be configured to transmit a common voltage during operation of the display device.

The display device may further include a metal pattern disposed between the first substrate and the dummy electrode pattern.

The metal pattern may be disposed on or in the same layer as the common voltage line.

The metal pattern may be separated from the common voltage line.

The display device may further include a projection disposed on the dummy electrode pattern.

The projection may be a plurality of spaced column spacers.

According to another aspect of the invention, a method of manufacturing a display device resistant to damage from static electricity includes the steps of forming a semi-conductor element vulnerable to damage from static electricity, forming an electrically conductive layer capable of transmitting static electricity to the semi-conductor element via an electrically conductive path, and forming an opening in the electrically conductive layer, the opening interrupting the electrically conductive path such that static electricity cannot be transmitted to the semi-conductor element.

The method may further include forming a color filter that reduces light leakage through the opening.

The method may further include forming a light emitting component and forming a sealant that prevents liquid from passing through the opening to the light emitting component.

According to the principles of the invention, it is possible to prevent damage to the display device caused by static electricity by suppressing the static electricity from being transferred into the display area of the display device.

The foregoing general description and the following detailed description are exemplary and explanatory and are intended to provide further explanation of the claimed subject matter

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
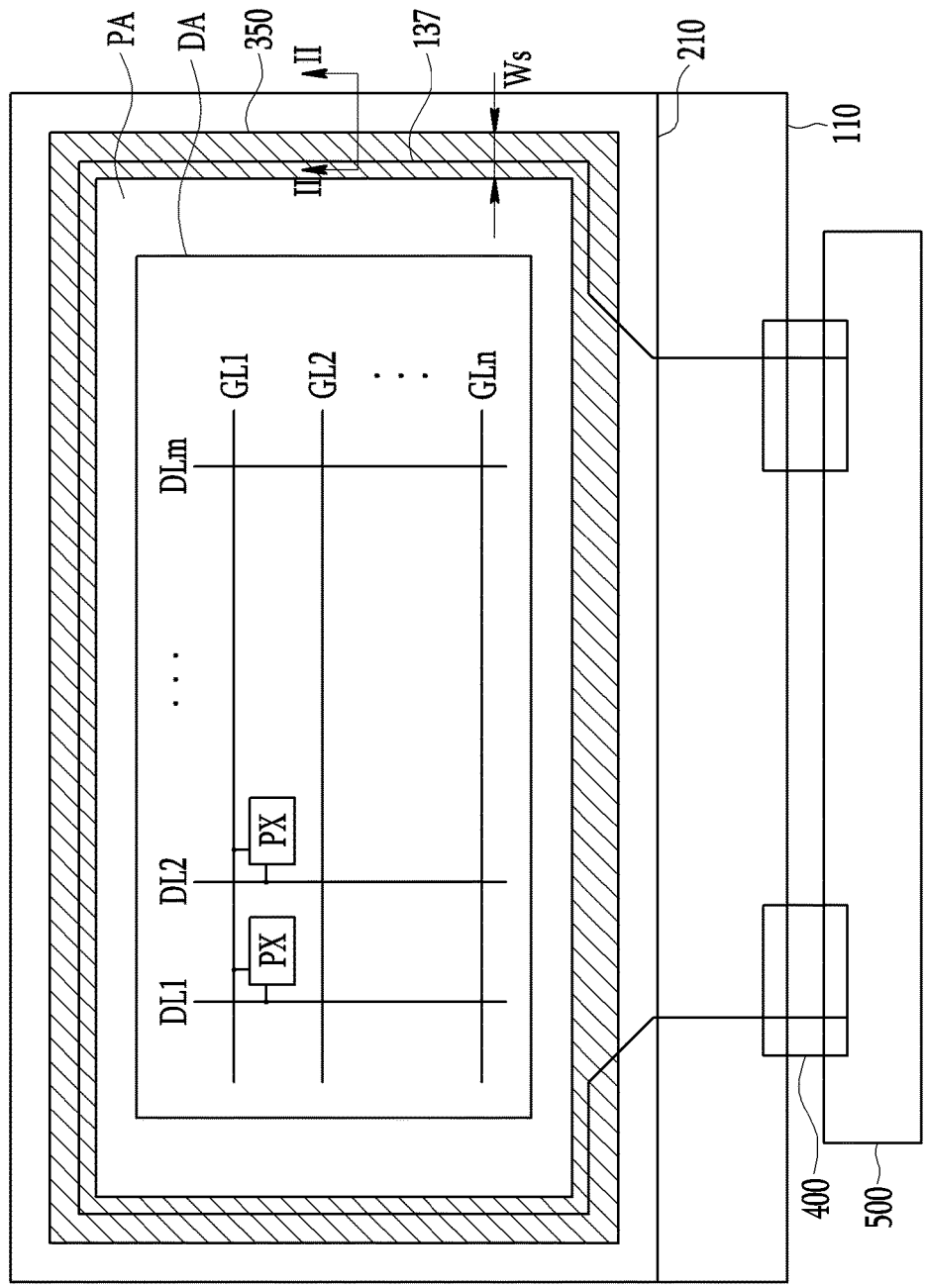
FIG. 1 is a schematic top plan view of a first embodiment of a display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Further, in the specification, the phrase "in a plan view" means when an object portion is viewed from above, and the phrase "in a cross-section" means when a cross-section taken by vertically cutting an object portion is viewed from the side.

A display device according to a first exemplary embodiment will hereinafter be described with reference to FIG. 1 and FIG. 2

Figure 2:
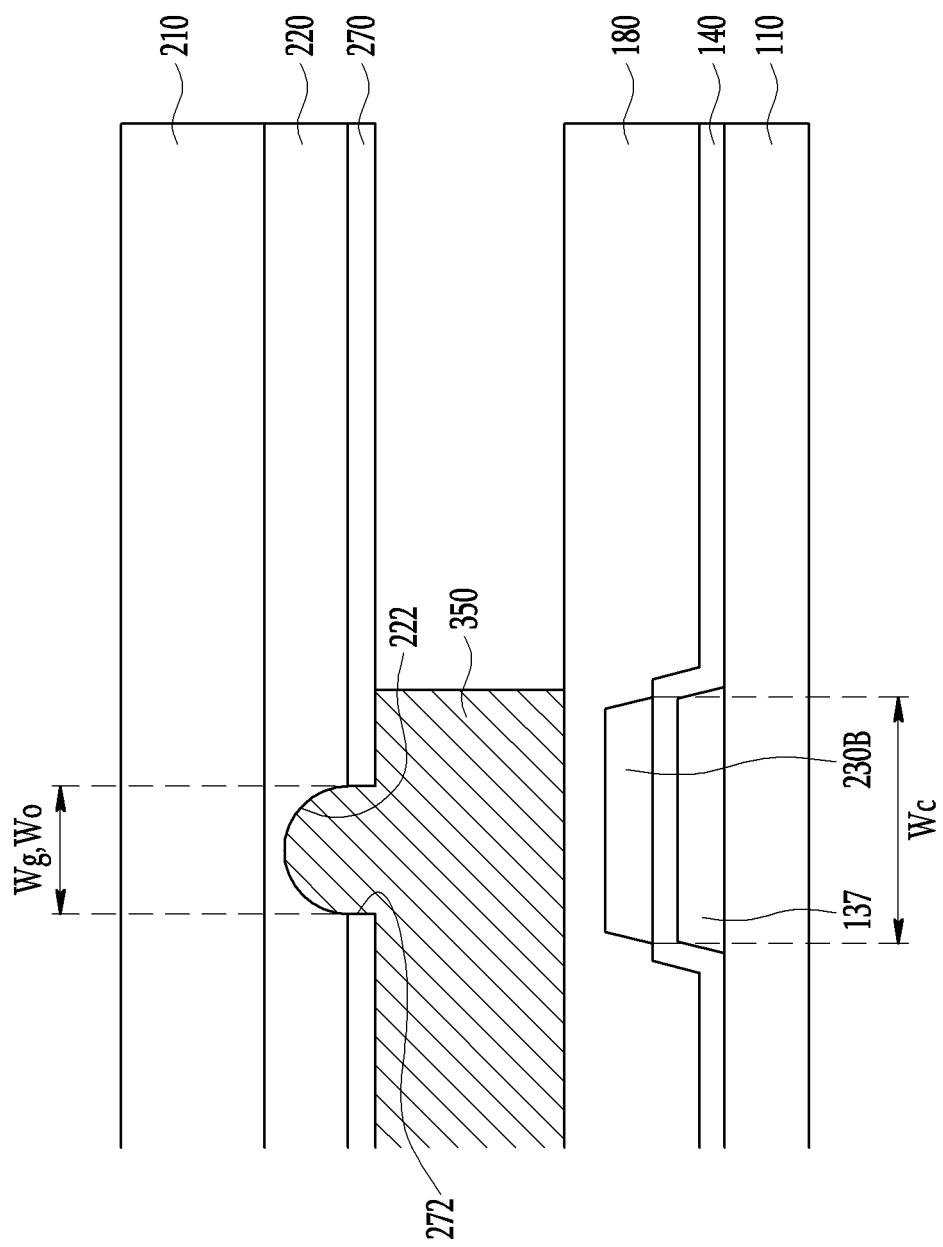
FIG. 2 is a cross-sectional view taken line II-II of FIG. 1 illustrating a gap in a conductive line with a sealant disposed in the gap.

As shown in FIG. 1 and FIG. 2, the display device includes a first substrate 110 and a second substrate 210 disposed to face each other, and a sealant 350 disposed between the first substrate 110 and the second substrate 210.

The first substrate 110 includes a display area DA and a peripheral area PA. The display area DA may be disposed at a center thereof, and the peripheral area PA may be disposed to surround the display area DA. In the display area DA, a plurality of gate lines GL1, . . . , and GLn are formed in a direction parallel with each other, and a plurality of data lines DL1, . . . , and DLm are formed in a direction parallel with each other. The gate lines GL1, . . . , and GLn and the data lines DL1, . . . , and DLm are insulated from each other and define a plurality of pixels PX. The pixels PX serve as a minimum unit for displaying an image and may be arranged in a matrix form. The pixels PX are connected with the gate lines GL1, . . . , and GLn and the data lines DL1, . . . , and DLm to receive predetermined signals.

The first substrate 110 may be made of transparent glass, plastic, or the like, and may have a substantially rectangular shape. A common voltage line 137 is disposed on the peripheral area PA of the first substrate 110. The common voltage line 137 may be made of a low-resistance metal material. The common voltage line 137 may be disposed directly on the first substrate 110. The common voltage line 137 may be disposed at a same layer as the gate lines GL1, . . . , and GLn, and may be made of a same material as the gate lines GL1, . . . , and GLn. The display area DA may be formed to have a substantially quadrangular shape, and the common voltage line 137 may be formed in such a form so as to surround the display area DA.

The display device may further include a printed circuit board (PCB) 500 for generating signals that are applied to the pixels PX, and a connection layer 400 for connecting the first substrate 110 with the printed circuit board 500. The first substrate 110 and the second substrate 210 are disposed to overlap each other, wherein the second substrate 210 covers the first substrate 110. In this case, a portion of the first substrate 110 is not covered by the second substrate 210. For example, a lower edge of the first substrate 110 is not overlapped with the second substrate 210. The connection layer 400 may be disposed at an edge of the first substrate 110 which is not covered by the second substrate 210, i.e., the lower edge of the first substrate 110.

The common voltage line 137 is connected with the first substrate 110 to surround a left edge, an upper edge, a right edge, and a portion of the lower edge thereof, and is connected not only with the connection layer 400 but also with the PCB 500. The common voltage line 137 receives a common voltage from the PCB 500. The common voltage may have a constant voltage, or may have a waveform in which the two voltages periodically fluctuate.

A gate insulating layer 140 may be disposed on the first substrate 110 and the common voltage line 137. The gate insulating layer 140 may include an inorganic or organic insulating material such as a silicon oxide (SiOx), a silicon nitride (SiNx), etc., and it may be formed as a single layer or a multilayer including at least one of the foregoing materials. The gate insulating layer 140 may be formed not only in the peripheral area PA of the first substrate 110 but also in the display area DA. In other words, the gate insulating layer 140 may be formed on an entire surface of the first substrate 110.

A color filter 230B may be disposed on the gate insulating layer 140. The color filter 230B may overlap the common voltage line 137.

The color filter 230B may display primary colors of red, green, and blue. However, the color filter 230B is not limited to the three primary colors of red, green, and blue, and may also display colors of cyan, magenta, yellow, and white. The color filter 230B is illustrated as being disposed on the peripheral area PA of the first substrate 110, but may also be disposed on the display area DA. The red, green, and blue filters may be disposed on the display area DA of the first substrate 110, and any one of the red, green, and blue color filters may be disposed on the peripheral area PA. For example, the blue filter may be disposed on the peripheral area PA. Among the red, green, and blue filters, the blue filter is most effective in terms of a shading effect. However, other configurations as possible, including forming two or more color filters to overlap each other. For example, the blue filter and the red filter may be formed in the peripheral area PA to overlap each other.

An insulating layer 180 may be disposed on the gate insulating layer 140 and the color filter 230B. The insulating layer 180 may include an inorganic or organic insulating material such as a silicon oxide (SiOx), a silicon nitride (SiNx), etc., and it may be formed as a single layer or a multilayer including at least one of the foregoing materials. The insulating layer 180 may be formed not only in the peripheral area PA of the first substrate 110 but also in the display area DA. In other words, the insulating layer 180 may be formed on an entire surface of the first substrate 110.

The second substrate 210 may be made of transparent glass, plastic, or the like, and may have a substantially rectangular shape.

A light blocking member 220 is disposed below the second substrate 210. The light blocking member 220 may be made of a light-blocking material, and may prevent light leakage by covering a portion other than a screen-displaying portion for displaying an image. The light blocking member 220 may be formed to overlap most portions of the peripheral area PA. In addition, the light blocking member 220 may be formed in the display area DA to surround the pixels PX. For example, the light blocking member 220 may overlap the gate lines GL1, . . . , and GLn and the data lines DL1, . . . , and DLm.

A common electrode 270 is disposed below the light blocking member 220. The common electrode 270 may be made of a transparent metal oxide such as indium tin oxide (ITO), indium zinc oxide (IZO), and the like. The common electrode 270 is formed to overlap most portions of the display area DA and the peripheral area PA. After the light blocking member 220 is formed in a bottom surface of the second substrate 210 and is patterned, the common electrode 270 may be formed along the entire bottom surface of the second substrate 210 over which the light blocking member 220 has been formed. Then, an opening 272 in the common electrode 270 may be formed by removing a portion of the common electrode 270 through a trimming process using a laser. The opening 272 may be positioned to overlap the peripheral area PA, particularly to overlap the sealant 350 and the common voltage line 137.

If static electricity flows into the second substrate 210 from the outside, it may be transferred along the common electrode 270 not only to the peripheral area PA but also to the display area DA. In the illustrated embodiments, the opening 272 is formed in the common electrode 270 to interrupt and thus block the moving path of the static electricity. The opening 272 is positioned to overlap the peripheral area PA, and thus it is possible to prevent the damage to the elements caused by the static electricity by blocking the transfer of the static electricity to the display area DA.

The light blocking member 220 adjacent to the common electrode 270 is also affected by the process of forming the opening 272 in the common electrode 270. Thus, a groove 222 may be formed by removing a portion of the light blocking member 220 which is overlapped with the opening 272. FIG. 2 illustrates the thickness of the light blocking member 220 where it overlaps the opening 272 reduced to about half, but that ratio may vary. Indeed, the portion of the light blocking member 220 overlapping the opening 272 may be completely removed. As such, light leakage may occur in the peripheral area PA through the groove 222 formed by the light blocking member 220. The color filter 230B is disposed on the first substrate 110 to overlap the opening 272 of the common electrode 270, and thus it is possible to prevent such light leakage.

A sealant 350 is disposed in the peripheral area PA to surround all of a left edge, an upper edge, a right edge, and a lower edge of the first substrate 110. The sealant 350 serves to adhere the first substrate 110 and the second substrate 210, and a liquid crystal layer is formed in an area surrounded by the sealant 350. The sealant 350 can block the entry of moisture or the like from the outside into the liquid crystal layer. The sealant 350 is overlapped with the opening 272 of the common electrode 270, the color filter 230B, and the common voltage line 137.

The width Ws of the sealant 350 is wider than the width Wo of the opening 272 of the common electrode 270 and is wider than the width Wc of the color filter 230B. The sealant 350 may overlap the entire opening 272 and may overlap the entire color filter 230B. In addition, the width Wc of the color filter 230B is wider than the width Wo of the opening 272 of the common electrode 270 and wider than the width Wg of the groove 222 of the light blocking member 220. The grooves 222 of the light blocking member 220 may be concave in a narrowing manner as moving through the light blocking member 220 closer to the second substrate 210. The width Wg of the groove 222 of the light blocking member 220 indicates a width of a portion farthest from the second substrate 210. In other words, the width Wg of the groove 222 of the light blocking member 220 indicates a maximum width of the groove 222. The color filter 230B overlaps the entire opening 272 of the common electrode 270 and the grooves 222 of the light blocking member 220. It is possible to block not only light that is introduced perpendicularly to the opening 272 but also light that is obliquely introduced by the action of the color filter 230B, by forming the width Wc of the color filter 230B wider than the width Wo of the opening 272 of the common electrode 270 and wider than the width Wg of the groove 222 of the light blocking member 220.

Figure 3:
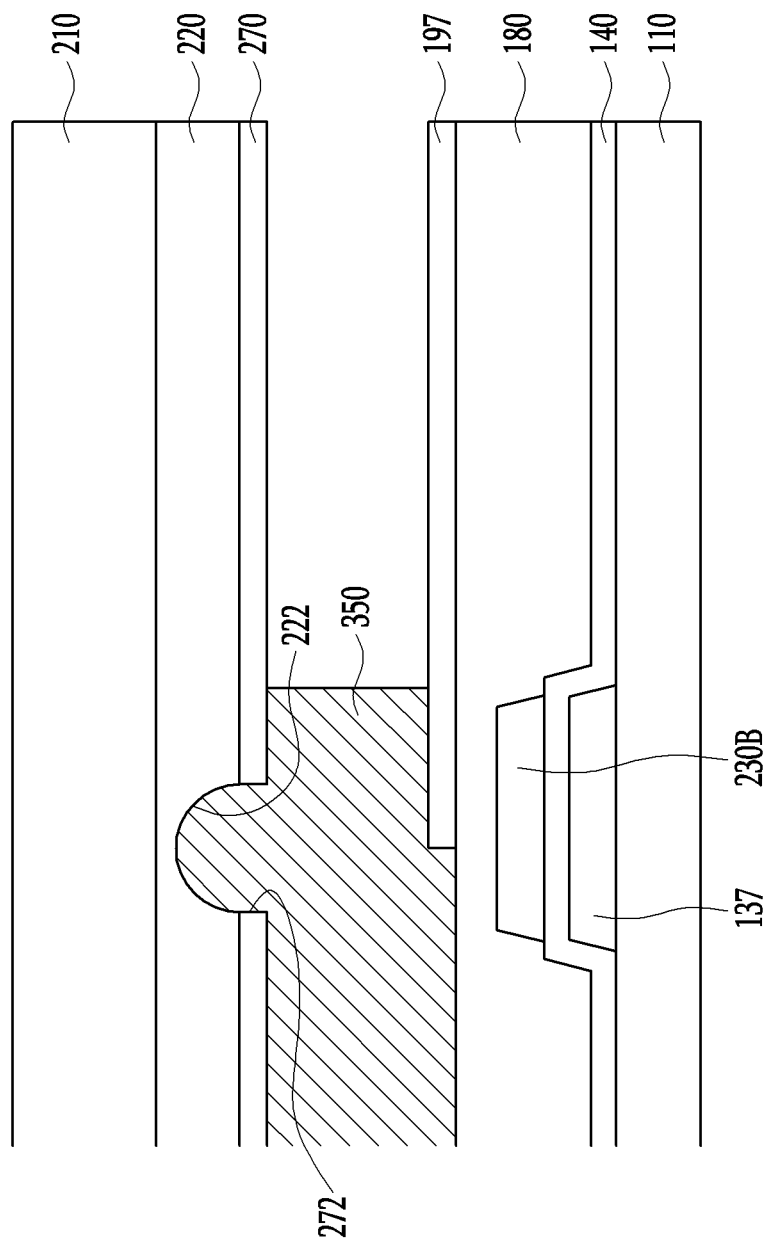
FIG. 3 is a cross-sectional view of a second embodiment of a display device constructed according to the principles of the invention having a dummy electrode pattern.

Referring now to the exemplary embodiment of FIG. 3, since the display device of FIG. 3 is substantially the same as the display device of FIG. 1 and FIG. 2, duplicative descriptions thereof will be omitted to avoid redundancy. In FIG. 3, a dummy electrode pattern 197 is further formed in the peripheral area, and this will be described in detail.

As shown in FIG. 3, the display device includes a first substrate 110 and a second substrate 210 disposed to face each other, and a sealant 350 disposed between the first substrate 110 and the second substrate 210. A common voltage line 137, a gate insulating layer 140, a color filter 230B, and an insulating layer 180 are disposed above the first substrate 110, while a light blocking member 220 and a common electrode 270 are disposed below the second substrate 210.

The display device according to this exemplary embodiment may further include a dummy electrode pattern 197 disposed on the first substrate 110. The dummy electrode pattern 197 may be made of a transparent metal oxide such as indium tin oxide (ITO), indium zinc oxide (IZO), and the like. The dummy electrode pattern 197 may be formed not only in the peripheral area PA of the first substrate 110 but also in the display area DA. The dummy electrode pattern 197 extends to an end of the first substrate 110, and a side surface of the dummy electrode pattern 197 is exposed to the outside. At least a portion of the dummy electrode pattern 197 is overlapped with the sealant 350, an opening 272 of the common electrode 270, the color filter 230B, and the common voltage line 137. The dummy electrode pattern 197 is not connected with other conductors within the display device, and thus is floated without receiving a voltage applied to and/or transmitted by other components of the display device.

The dummy electrode pattern 197 is disposed to face the common electrode 270. A capacitor can be formed overlapping the dummy electrode pattern 197 and the common electrode 270. Particularly, a portion of the common electrode 270 disposed at an outer circumference of the second substrate 210 overlaps the dummy electrode pattern 197 with respect to the opening 272. Static electricity flowing from the outside is blocked by the opening 272 formed in the common electrode 270 without being transferred to the display area DA. In addition, the static electricity may be stored in a capacitor formed between the common electrode 270 and the dummy electrode pattern 197. Accordingly, the effect of reducing or entirely preventing damage to various elements of the display device by the static electricity can be further improved.

Figure 4:
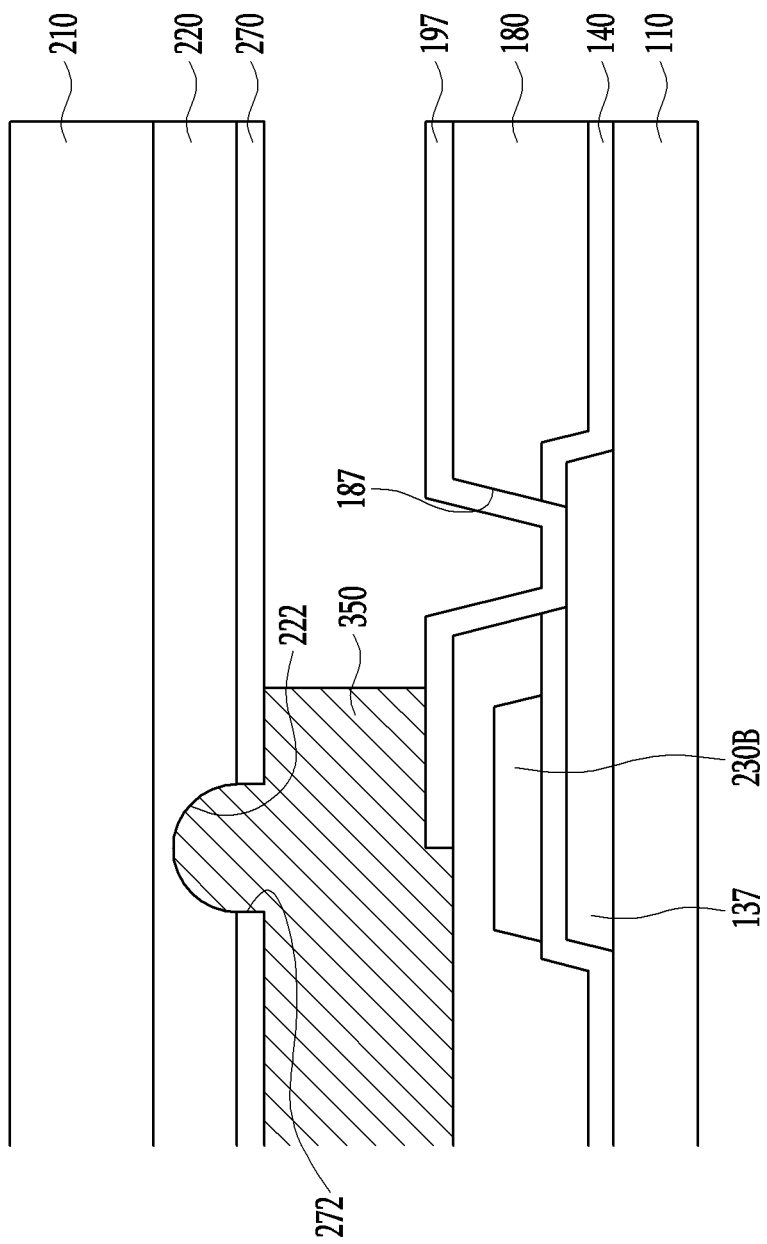
FIG. 4 is a cross-sectional view of a third embodiment of a display device constructed according to the principles of the invention having a dummy electrode pattern connected to a common voltage line.

Referring now to the exemplary embodiment of FIG. 4, since the display device of FIG. 4 is substantially the same as the display device of FIG. 3, duplicative descriptions thereof will be omitted to avoid redundancy. In FIG. 4, the dummy electrode pattern 197 is connected with the common voltage line 137, and this will be described in detail.

As shown in FIG. 4, the display device includes a first substrate 110 and a second substrate 210 disposed to face each other, and a sealant 350 disposed between the first substrate 110 and the second substrate 210. A common voltage line 137, a gate insulating layer 140, a color filter 230B, an insulating layer 180, and a dummy electrode pattern 197 are disposed above the first substrate 110, while a light blocking member 220 and a common electrode 270 are disposed below the second substrate 210.

The gate insulating layer 140 and the insulating layer 180 are disposed between the common voltage line 137 and the dummy electrode pattern 197. A contact hole 187 is formed in the gate insulating layer 140 and the insulating layer 180 to at least partially overlap the common voltage line 137. The dummy electrode pattern 197 is formed at the inner surface of the insulating layer 180 and inside the contact hole 187. Accordingly, the dummy electrode pattern 197 is connected with the common voltage line 137 through the contact hole 187. A common voltage may be applied to the common voltage line 137, and may also be applied to the dummy electrode pattern 197 through the common voltage line 137.

The contact hole 187 may be formed to not overlap the color filter 230B. If the contact hole 187 is formed to overlap the color filter 230B, light leakage may occur in an area in which the contact hole 187 is formed. It is possible to prevent the light leakage through the contact hole 187 by forming the contact hole 187 to not overlap the color filter 230B.

The dummy electrode pattern 197 is disposed to face the common electrode 270. A capacitor can be formed by overlapping the dummy electrode pattern 197 and the common electrode 270. Particularly, a portion of the common electrode 270 disposed at an outer circumference of the second substrate 210 overlaps the dummy electrode pattern 197 with respect to the opening 272. Static electricity flowing from the outside is blocked by the opening 272 formed in the common electrode 270 without being transferred to the display area DA. In addition, the static electricity may be stored in a capacitor formed between the common electrode 270 and the dummy electrode pattern 197. In this case, the dummy electrode pattern 197 is connected with the common voltage line 137 formed of a low-resistance metal material, and the capacitance of the capacitor may thereby be increased. Accordingly, the effect of reducing or even entirely preventing damage to various elements of the display device by the static electricity can be further improved.

Figure 5:
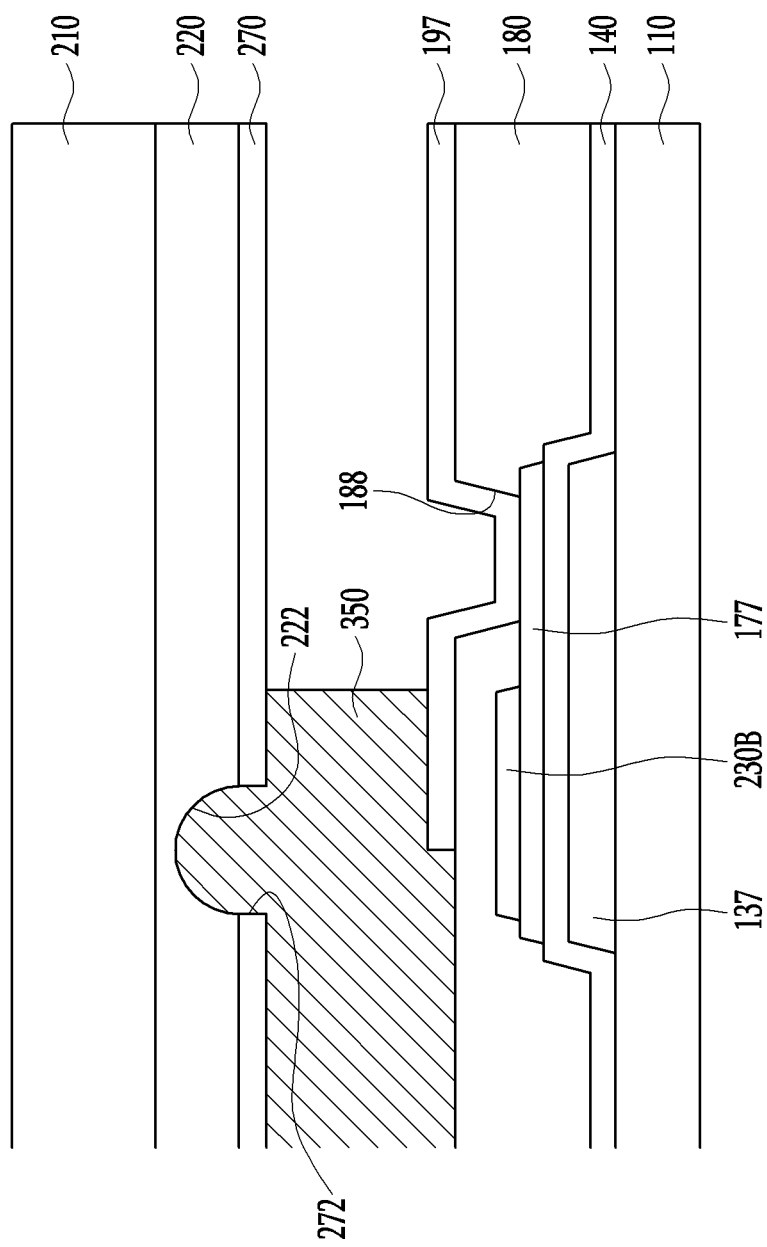
FIG. 5 is a cross-sectional view of a fourth embodiment of a display device constructed according to the principles of the invention having a dummy common voltage line formed between a dummy electrode pattern and a common voltage line.

Referring now to the exemplary embodiment of FIG. 5, since the display device of FIG. 5 is substantially the same as the display device of FIG. 3, duplicative descriptions thereof will be omitted to avoid redundancy. In FIG. 5, a dummy common voltage line 177 is further formed between the dummy electrode pattern 197 and the common voltage line 137, and this will be described in detail.

As shown in FIG. 5, the display device includes a first substrate 110 and a second substrate 210 disposed to face each other, and a sealant 350 disposed between the first substrate 110 and the second substrate 210. A common voltage line 137, a gate insulating layer 140, a color filter 230B, an insulating layer 180, and a dummy electrode pattern 197 are disposed above the first substrate 110, while a light blocking member 220 and a common electrode 270 are disposed below the second substrate 210.

The display device may further include a dummy common voltage line 177 disposed on the first substrate 110. The dummy common voltage line 177 may be disposed between the common voltage line 137 and the dummy electrode pattern 197. The dummy common voltage line 177 may be disposed in the peripheral area PA, and may be made of a low-resistance metal material. The dummy common voltage line 177 may be disposed in or on the same layer as the data lines DL1, . . . , and DLm disposed in the display area DA, and may be formed of the same material as the data lines DL1, . . . , and DLm.

The dummy common voltage line 177 may overlap the common voltage line 137. Similar to the common voltage line 137, the dummy common voltage line 177 is connected with the first substrate 110 to surround a left edge, an upper edge, a right edge, and a portion of a lower edge thereof, and is connected not only with the connection layer 400 but also with the PCB 500. The dummy common voltage line 177 may receive a common voltage from the PCB 500. The common voltage may be a constant voltage or may have a waveform in which two voltages periodically fluctuate. The same common voltage may be applied to the dummy common voltage line 177 and the common voltage line 137.

An insulating layer 180 may be disposed between the dummy common voltage line 177 and the dummy electrode pattern 197. A contact hole 188 is formed in the insulating layer 180 to at least partially overlap the dummy common voltage line 177. The dummy electrode pattern 197 is formed inside the contact hole 188 on the insulating layer 180. Accordingly, the dummy electrode pattern 197 is connected with the dummy common voltage line 177 through the contact hole 188. A common voltage may be applied to the dummy common voltage line 177, and may also be applied to the dummy electrode pattern 197 through the dummy common voltage line 177.

The contact hole 188 may be formed to not overlap the color filter 230B. If the contact hole 188 is formed to overlap the color filter 230B, light leakage may occur in an area in which the contact hole 188 is formed. It is possible to prevent the light leakage by forming the contact hole 188 to not overlap the color filter 230B.

The dummy electrode pattern 197 is disposed to face the common electrode 270. A capacitor can be formed overlapping the dummy electrode pattern 197 and the common electrode 270. Particularly, a portion of the common electrode 270 disposed at an outer circumference of the second substrate 210 overlaps the dummy electrode pattern 197 with respect to the opening 272. Static electricity flowing from the outside is blocked by the opening 272 formed in the common electrode 270 without being transferred to the display area DA. In addition, the static electricity may be stored in a capacitor formed between the common electrode 270 and the dummy electrode pattern 197. In this case, the dummy electrode pattern 197 is connected with the common voltage line 137 formed of a low-resistance metal material, and the capacitance of the capacitor may be increased. Accordingly, the effect of reducing or even entirely preventing damage to various elements of the display device by the static electricity can be further improved.

Figure 6:
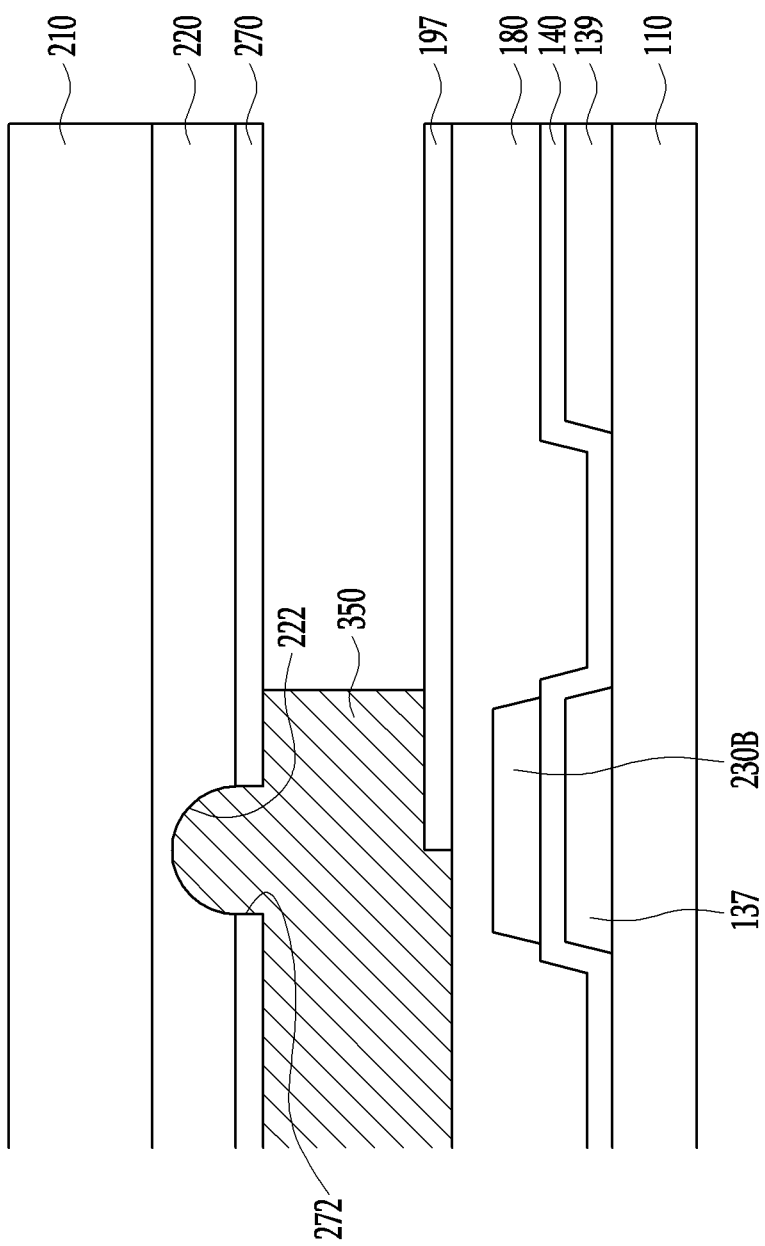
FIG. 6 is a cross-sectional view of a fifth embodiment of a display device constructed according to the principles of the invention having a metal pattern further formed on the first substrate.

Referring now to the exemplary embodiment of FIG. 6, since the display device of FIG. 6 is substantially the same as the display device of FIG. 3, duplicative descriptions thereof will be omitted to avoid redundancy. In FIG. 6, a metal pattern 139 is further formed on the first substrate 110, and this will be described in detail.

As shown in FIG. 6, the display device includes a first substrate 110 and a second substrate 210 disposed to face each other, and a sealant 350 disposed between the first substrate 110 and the second substrate 210. A common voltage line 137, a gate insulating layer 140, a color filter 230B, an insulating layer 180, and a dummy electrode pattern 197 are disposed above the first substrate 110, while a light blocking member 220 and a common electrode 270 are disposed below the second substrate 210.

The display device may further include a metal pattern 139 disposed on the first substrate 110. The metal pattern 139 may be disposed between the common voltage line 137 and the dummy electrode pattern 197. The gate insulating layer 140 and the insulating layer 180 may be disposed between the metal pattern 139 and the dummy electrode pattern 197. The metal pattern 139 may be disposed directly on the first substrate 110, and may be disposed in the peripheral area PA. The metal pattern 139 extends to an end of the first substrate 110, and a side surface of the metal pattern 139 is exposed to the outside. The metal pattern 139 may be made of a low-resistance metal material. The metal pattern 139 may be disposed in or on the same layer as the common voltage line 137, and may be formed of the same material as the common voltage line 137. The metal pattern 139 is not connected with the common voltage line 137, and the metal pattern 139 and the common voltage line 137 are separated from each other by a predetermined interval. In addition, the metal pattern 139 may be disposed in or on the same layer as the gate lines GL1, . . . , and GLn disposed in the display area DA, and may be formed of the same material as the gate lines GL1, . . . , and GLn. The metal pattern 139 is not connected with other conductors, and thus is floated without receiving a voltage transmitted by other conductive elements of the display device. Even if an exposed side of the metal pattern 139 is corroded, it is not connected to other conductors, and thus does not affect signals applied to other conductors of the display device.

A capacitor can be formed by overlapping the dummy electrode pattern 197 and the common electrode 270. Particularly, a portion of the common electrode 270 disposed at an outer circumference of the second substrate 210 overlaps the dummy electrode pattern 197 with respect to the opening 272. Static electricity flowing from the outside is blocked by the opening 272 formed in the common electrode 270 without being transferred to the display area DA. In addition, the static electricity may be stored in a capacitor formed between the common electrode 270 and the dummy electrode pattern 197. Furthermore, it is possible to additionally form a capacitor by overlapping the metal pattern 139 and the dummy electrode pattern 197 between the gate insulating layer 140 and the insulating layer 180. Accordingly, the benefit of reducing or even preventing damage to various elements of the display device by the static electricity can be further improved.

Figure 7:
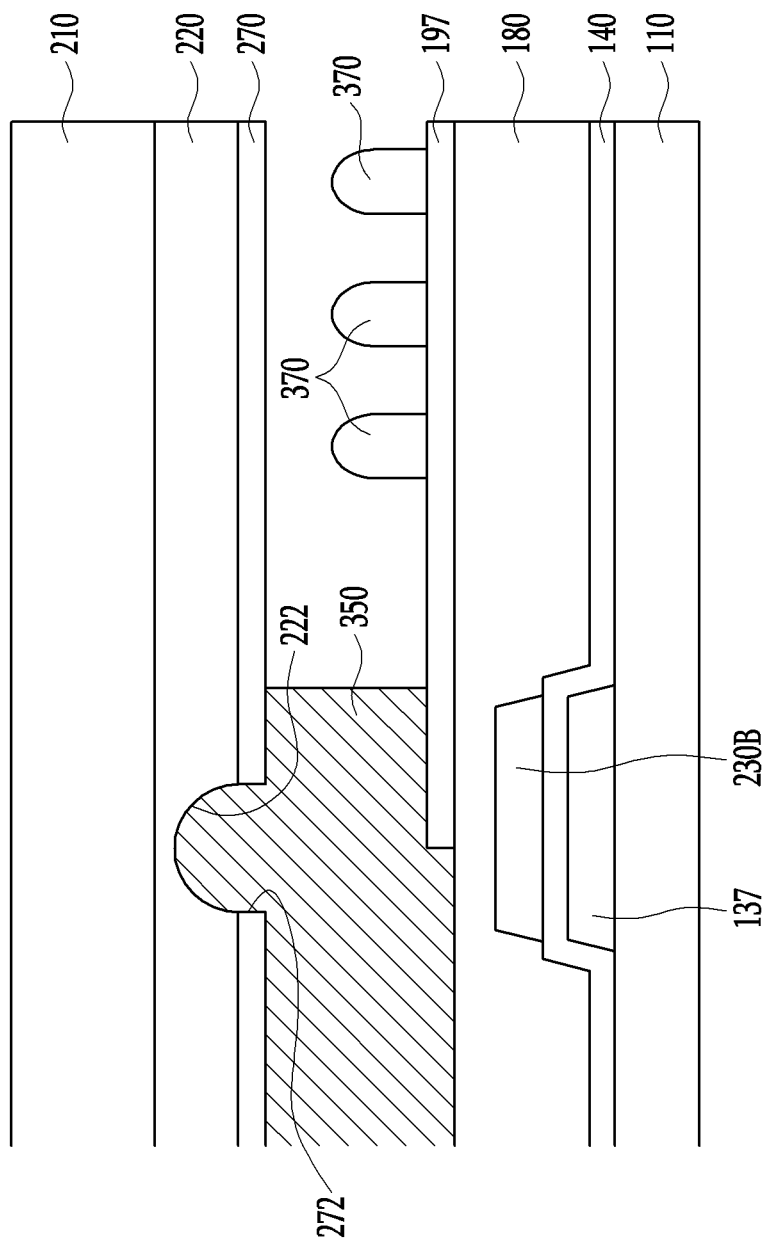
FIG. 7 is a cross-sectional view of a sixth embodiment of a display device constructed according to the principles of the invention having a column spacer formed on the first substrate.

Referring now to the exemplary embodiment of FIG. 7, since the display device of FIG. 7 is substantially the same as the display device of FIG. 3, duplicative descriptions thereof will be omitted to avoid redundancy. In FIG. 7, a column spacer 370 is further formed on the first substrate 110, and this will be described in detail.

As shown in FIG. 7, the display device includes a first substrate 110 and a second substrate 210 disposed to face each other, and a sealant 350 disposed between the first substrate 110 and the second substrate 210. A common voltage line 137, a gate insulating layer 140, a color filter 230B, an insulating layer 180, and a dummy electrode pattern 197 are disposed above the first substrate 110, while a light blocking member 220 and a common electrode 270 are disposed below the second substrate 210.

The display device may further include a column spacer 370 disposed on the first substrate 110. The column spacer 370 may be disposed directly on the first substrate 110, and may be disposed between the dummy electrode pattern 197 and the common electrode 270. The column spacer 370 may include one or more projections and be made of an organic material. As shown in FIG. 7, the column spacer 370 may contact the dummy electrode pattern 197 so as to extend upwardly away from the dummy electrode pattern 197. Thus, the column spacers may be spaced apart from each other by a predetermined interval and may be separated from the common electrode 270 by a predetermined distance. However, other configurations are permissible. For example, the column spacers 370 may have a thickness corresponding to a distance between the dummy electrode pattern 197 and the common electrode 270. In FIG. 7, three column spacers 370 are depicted, but the number of column spacers 370 may be smaller than 3 or greater than 3.

Static electricity flowing from the outside is blocked by the opening 272 formed in the common electrode 270 without being transferred to the display area DA. In this case, the static electricity may be dispersed to a column spacer 370 disposed below the common electrode 270. The static electricity dispersed through the column spacer 370 can be transferred to the dummy electrode pattern 197 and finally discharged in the dummy electrode pattern 197. Accordingly, it is possible to reduce or prevent various elements of the display device from being damaged by the static electricity.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising:
a first substrate having a display area and a peripheral area surrounding the display area;
a second substrate facing the first substrate;
a common voltage line disposed on the peripheral area of the first substrate;
a color filter disposed on the common voltage line overlapping the common voltage line;
a common electrode disposed below the second substrate and having an opening overlapping the common voltage line and the color filter;
a sealant disposed between the color filter and the common electrode overlapping the common voltage line, the color filter, and the opening;
a light blocking member disposed between the second substrate and the common electrode;
a groove formed in a bottom surface of the light blocking member; and
wherein the groove overlaps the opening in the common electrode.

2. A display device comprising:
a first substrate having a display area and a peripheral area surrounding the display area;
a second substrate facing the first substrate;
a common voltage line disposed on the peripheral area of the first substrate;
a color filter disposed on the common voltage line overlapping the common voltage line;
a common electrode disposed below the second substrate and having an opening overlapping the common voltage line and the color filter;

a sealant disposed between the color filter and the common electrode overlapping the common voltage line, the color filter, and the opening;

a light blocking member disposed on the second substrate;

a groove formed in a bottom surface of the light blocking member; and a width of the color filter is wider than at least one of a width of the groove and a width of the opening.

3. The display device of claim 1, wherein a width of the sealant is wider than that of the opening.

4. The display device of claim 1, wherein the color filter is a blue filter.

5. The display device of claim 1, further comprising a dummy electrode pattern disposed on the first substrate.

6. A display device comprising:

a first substrate having a display area and a peripheral area surrounding the display area;

a second substrate facing the first substrate;

a common voltage line disposed on the peripheral area of the first substrate;

a color filter disposed on the common voltage line overlapping the common voltage line;

a common electrode disposed below the second substrate and having an opening overlapping the common voltage line and the color filter;

a sealant disposed between the color filter and the common electrode overlapping the common voltage line, the color filter, and the opening;

a dummy electrode pattern disposed on the first substrate; and wherein the dummy electrode pattern is disposed between the color filter and the sealant.

7. The display device of claim 6, wherein the dummy electrode pattern is electrically isolated.

8. The display device of claim 6, wherein the dummy electrode pattern is connected with the common voltage line.

9. The display device of claim 8, further comprising:

an insulating layer disposed between the dummy electrode pattern and the common voltage line; and a contact hole formed in the insulating layer overlapping the common voltage line, wherein the dummy electrode pattern is connected with the common voltage line through the contact hole.

10. The display device of claim 9, wherein the contact hole does not overlap the color filter.

11. The display device of claim 8, wherein the dummy electrode pattern and the common voltage line are configured to transmit a common voltage during operation of the display device.

12. The display device of claim 6, further comprising a dummy common voltage line disposed between the dummy electrode pattern and the common voltage line, wherein the dummy electrode pattern is connected with the dummy common voltage line.

13. The display device of claim 12, further comprising:

an insulating layer disposed between the dummy electrode pattern and the dummy common voltage line; and a contact hole formed in the insulating layer to overlap the dummy common voltage line, wherein the dummy common voltage line is connected with the dummy common voltage line through the contact hole.

14. The display device of claim 13, wherein the contact hole does not overlap the color filter.

15. The display device of claim 14, wherein the dummy electrode pattern and the dummy common voltage line are configured to transmit a common voltage during operation of the display device.

16. The display device of claim 6, further comprising a metal pattern disposed between the first substrate and the dummy electrode pattern.

17. The display device of claim 16, wherein the metal pattern is disposed on or in the same layer as the common voltage line.

18. The display device of claim 17, wherein the metal pattern is separated from the common voltage line.

19. The display device of claim 6, further comprising a projection disposed on the dummy electrode pattern.

20. The display device of claim 19, wherein the projection comprises a plurality of spaced, column spacers.

* * * * *